(12) United States Patent
Watanabe (10) Patent No.: US 11,010,117 B2
(45) Date of Patent: May 18, 2021

(54) PRINTING APPARATUS AND CONTROL METHOD OF PRINTING APPARATUS

(71) Applicant: SEIKO EPSON CORPORATION, Tokyo (JP)

(72) Inventor: Ikumi Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/260,737

(22) Filed: Jan. 29, 2019

(65) Prior Publication Data
US 2019/0235813 A1   Aug. 1, 2019

(30) Foreign Application Priority Data

Feb. 1, 2018   (JP) .............................. JP2018-016618

(51) Int. Cl.
*G06F 3/12*        (2006.01)
(52) U.S. Cl.
CPC .......... *G06F 3/1268* (2013.01); *G06F 3/1238* (2013.01); *G06F 3/1286* (2013.01); *G06F 3/1295* (2013.01); *G06F 3/1296* (2013.01)
(58) Field of Classification Search
USPC ................................................ 358/1.1–3.29
See application file for complete search history.

(56) References Cited

U.S. PATENT DOCUMENTS

| 2002/0089689 | A1* | 7/2002 | Ferlitsch | ................ | G06F 3/1203 |
| | | | | | 358/1.15 |
| 2007/0213870 | A1* | 9/2007 | Roberts | ................. | G06F 3/1288 |
| | | | | | 700/219 |
| 2016/0255231 | A1* | 9/2016 | Sakata | ............... | H04N 1/00933 |
| | | | | | 358/1.12 |

FOREIGN PATENT DOCUMENTS

JP           2002-265135 A        9/2002

* cited by examiner

*Primary Examiner* — Marcellus J Augustin
(74) *Attorney, Agent, or Firm* — Workman Nydegger (57) ABSTRACT

A printer includes a printing unit that processes the first print request accumulated in a reception buffer to print an image on a sheet, a sheet discharge tray to which a sheet on which an image is printed by the printing unit is discharged, and a controller that causes the printing unit to discharge, to the sheet discharge tray, an insertion sheet different from a sheet on which an image is printed by processing a print request before causing the printing unit to process a first print request in a case where a request source of the first print request is different from a request source of a second print request which is a print request immediately before the first print request.

8 Claims, 2 Drawing Sheets

FIG. 2

PRINTING APPARATUS AND CONTROL METHOD OF PRINTING APPARATUS

BACKGROUND

1. Technical Field

The present invention relates to a printing apparatus and a method of controlling the printing apparatus.

2. Related Art

There has been known a technique of inserting an insertion sheet between a print job and a print job so as to facilitate sorting of discharged sheets (see, for example, JP-A-2002-265135). JP-A-2002-265135 discloses an image forming apparatus that inserts a slip sheet between print jobs.

However, in a case where the insertion sheet is inserted every time the print request is switched, a large number of insertion sheets are consumed, and throughput of printing may decreases.

SUMMARY

An advantage of some aspects of the invention is to facilitate sorting of discharged sheets while suppressing reduction in throughput of printing.

According to a first aspect of the invention, a printing device includes a receiving unit that receives a print request, a printing unit that processes the print request received by the receiving unit to print an image on a sheet, a sheet discharge tray to which the sheet on which the image is printed by the printing unit is discharged, and a control unit that causes the printing unit to discharge, to the sheet discharge tray, an insertion sheet different from a sheet on which an image is printed by processing a print request before causing the printing unit to process a first print request in a case where a request source of the first print request is different from a request source of a second print request which is a print request immediately before the first print request. According to this configuration, in a case where a request source of the first print request is different from a request source of the second print request, the sheet for which the first print request is processed is discharged to the sheet discharge tray so that switching of the request source is distinguishable. Therefore, reduction in throughput of printing can be suppressed and sorting of the discharged sheet can be easily performed, compared with the case of inserting the insertion sheet every time the print request is switched.

It is preferable that in a case where user information indicating a request source of the first print request is different from user information indicating a request source of the second print request, the control unit cause the printing unit to discharge, to the sheet discharge tray, an insertion sheet different from a sheet on which an image is printed by processing a print request before causing the printing unit to process the first print request. According to this configuration, in a case where the user information which is a request source of the first print request is different from the user information which is a request source of the second print request, the insertion sheet is inserted. The insertion sheet is inserted in a case where the user information is switched, so that the insertion sheet is not inserted in a case of processing a print request from the same request source. Therefore, consumption of the insertion sheet can be suppressed.

It is preferable that the control unit acquire, as information indicating a request source of the first print request, a group name identifying a group to which a user indicated by user information belongs from the first print request, and do not cause the printing unit to output the insertion sheet to the sheet discharge tray in a case where the acquired group name is identical to a group name acquired from the second print request. According to this configuration, even when the user information indicating a request source of the first print request is different from the user information indicating a request source of the second print request, the insertion sheet is not inserted in a case where the acquired group name is identical to the group name acquired from the second print request. Therefore, it is possible to easily sort the discharged sheet while suppressing consumption of the insertion sheet.

It is preferable that in a case where the control unit is not able to acquire user information as information indicating a request source of the first print request, the control unit acquire, from the first print request, as information indicating the request source, a host name indicating a host device that is a transmission source of the first print request, or a file name of an image to be printed, compare the acquired host name or the acquired file name with a host name or a file name acquired from the second print request, and in a case where the respective host names or the respective file names are different, cause the printing unit to output the insertion sheet to the sheet discharge tray before causing the printing unit to process the first print request. According to this configuration, in a case where the control unit is not able to acquire user information as information indicating a request source of the first print request, it is determined whether the respective request sources are identical by comparing the respective host names or the respective file names. Therefore, even in a case where the user information cannot be acquired, it is determined whether the respective request sources are identical, and in a case where the respective request sources are not identical, the insertion sheet can be inserted.

It is preferable that the control unit cause the printing unit to print information indicating a request source of the second print request on a first surface of the insertion sheet, and cause the printing unit to print information indicating a request source of the first print request on a second surface of the insertion sheet. According to this configuration, information indicating the request source is printed on the first surface and the second surface of the insertion sheet. Therefore, sorting of discharged sheets can be performed more easily.

It is preferable that in a case where the control unit is not able to acquire information indicating respective request sources from the first print request and the second print request, the control unit cause the printing unit to output the insertion sheet to the sheet discharge tray before causing the printing unit to process the first print request. According to this configuration, in a case where information indicating the request source cannot be acquired from the first print request and the second print request, it is determined that the request is a print request from a different request source, and the insertion sheet can be inserted.

It is preferable that the printing apparatus further include a sheet discharge unit that discharges a sheet on which an image is printed by the printing unit to the sheet discharge tray. In a case where a request source of the first print request is identical to a request source of the second print request, the control unit causes the sheet discharge unit to perform sheet discharge such that a discharge position at the sheet discharge tray of a sheet for which the first print request is processed is different from a discharge position at the sheet discharge tray of a sheet for which the second print request. According to this configuration, in a case where a request source of the first print request is identical to the request source of the second print request, the sheets are discharged such that the discharge positions at the sheet discharge tray are different. Therefore, it is possible to easily sort the discharged sheet while suppressing consumption of the insertion sheet.

It is preferable that the control unit switches whether to discharge a sheet to the sheet discharge tray so that switching of a request source is distinguishable in accordance with setting information received by the receiving unit. According to this configuration, it is possible to switch whether to discharge the sheet to the sheet discharge tray so that switching of the request source is distinguishable by transmitting setting information from the outside.

According to a second aspect of the invention, a method of controlling a printing apparatus includes determining whether a request source of a received first print request is different from a request source of a second print request which is a print request immediately before the first print request, processing the first print request to print an image on a sheet, and discharging the sheet for which the first print request is processed to a sheet discharge tray. In a case where it is determined by the determining that a request source of the first print request is different from a request source of the second print request the discharging includes discharging, to the sheet discharge tray, an insertion sheet different from a sheet on which an image is printed by processing a print request before causing the printing unit to process the first print request. According to this configuration, in a case where a request source of the first print request is different from a request source of the second print request, the sheet for which the first print request is processed is discharged to the sheet discharge tray so that switching of the request source is distinguishable. Therefore, reduction in throughput of printing can be suppressed and sorting of the discharged sheet can be easily performed, compared with the case of inserting the insertion sheet every time the print request is switched.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
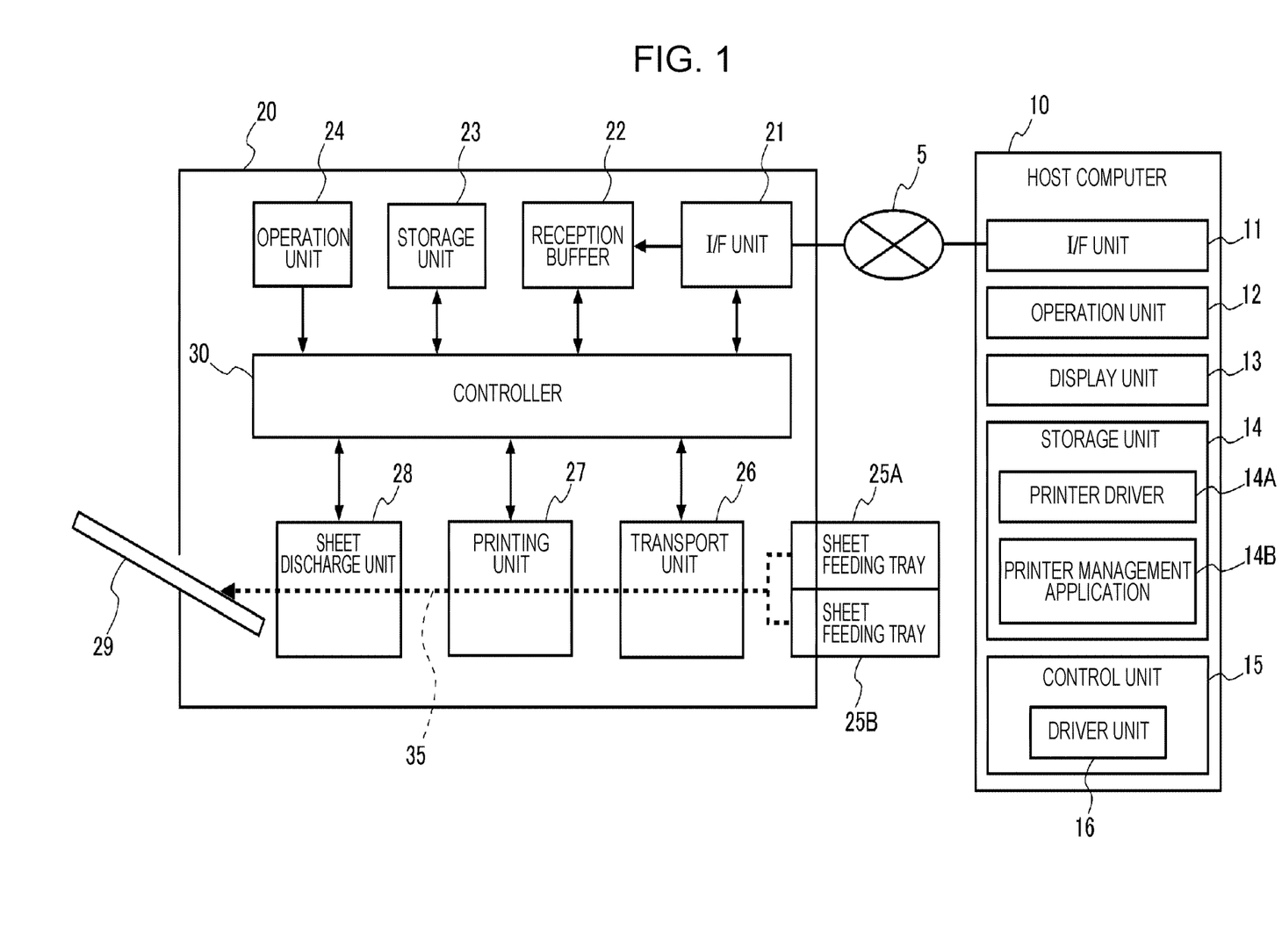
FIG. 1 is a configuration diagram of a host computer and a printer.

Hereinafter embodiments of the invention will be described with reference to the accompanying drawings. FIG. 1 is a configuration diagram of a host computer 10 and a printer 20. The host computer 10 operates as a host device of the invention. Further, the printer 20 operates as a printing apparatus of the invention.

This embodiment includes a configuration in which the host computer 10 and the printer 20 are connected via a network 5 such as a LAN. Although one host computer 10 is shown in FIG. 1, the number of host computers 10 connected to the network 5 and capable of transmitting print requests to the printer 20 is not limited. In addition, although FIG. 1 shows one printer 20, the number of printers 20 connected to the network 5 and performing print processing by receiving a print request is not limited.

The host computer 10 includes an I/F unit 11 that operates as an interface of the network 5, an operation unit 12 that accepts an operation of a user, a display unit 13 such as an LCD, and a storage unit 14 that includes a hard disk device, an SSD, and the like. Further, the host computer 10 includes a control unit 15 including a CPU, a ROM, a RAM, and the like (none of which are shown).

The storage unit 14 stores an application program executed by the CPU. The application program stored in the storage unit 14 includes a printer driver 14A and a printer management application 14B. These application programs will be described later.

The control unit 15 includes a CPU, a ROM, and a RAM (none of which are shown) as hardware. The ROM is a nonvolatile storage device, and stores a control program and data. The RAM is used as a work area of the CPU. The CPU expands the control program read from the ROM and the storage unit 14 into the RAM, and executes the expanded control program to control each unit of the host computer 10.

The control unit 15 reads and performs the printer driver 14A from the storage unit 14. As a result, the control unit 15 operates as a driver unit 16. The driver unit 16 causes the display unit 13 to display a screen for print setting (hereinafter referred to as a print setting screen) of the printer 20. Setting items such as sheet size, setting of duplex printing, setting of color or monochrome printing, setting of the number of copies, and the like are displayed on the print setting screen. The driver unit 16 accepts the setting of each item on the print setting screen from the operation unit 12 and stores the setting of each accepted item in the RAM. Further, the driver unit 16 converts text data and image data output from the application program into print data.

In addition, the driver unit 16 generates a print request. This print request includes setting for each item accepted on the print setting screen, print data, and print commands (print start command and print end command). Further, the print setting includes request source information indicating the request source of the print request. The request source information includes user information for identifying the user who has logged in the host computer 10 and made a print request, and a host name as identification information of the host computer 10. In addition, the request source information includes the file name of text data or image data converted into print data. In addition, in a case where the user of the user information has made a group registration, the request source information includes a group name which is identification information for identifying the group.

Upon generating the print request, the control unit 15 transmits the generated print request to the printer 20 by the I/F unit 11.

Further, the control unit 15 reads out and performs the printer management application 14B from the storage unit 14. The printer management application 14B is connected to the network 5 and is capable of managing the ink remaining amount of a plurality of registered printers 20, changing settings, and the like. The control unit 15 performs the printer management application 14B to communicate with each of the printers 20, and acquires the information on the ink remaining amount from each printer 20. The control unit 15 displays information on the acquired ink remaining amount on a screen (hereinafter referred to as an application screen) provided by the printer management application 14B. Further, a setting field for setting whether to insert the slip sheet in the printer 20 is displayed on this application screen. This setting field may be provided for each printer 20 or may be provided such that a plurality of registered printers 20 is collectively set. Further, in a case where inserting a slip sheet, a setting field for setting a sheet feeding tray for feeding the slip sheet is displayed on the application screen. The slip sheet is an insertion sheet inserted between printed matters on which print data is printed. In this embodiment, the slip sheet is inserted between printed matters to be printed in response to requests from different users.

In a case where the setting of the application screen is changed and the setting change instruction is accepted by the operation unit 12, the control unit 15 transmits the changed setting information to each of the registered printers 20 or the printer 20 whose setting has been changed.

Next, the configuration of the printer 20 will be described. The printer 20 includes an I/F unit 21, a reception buffer 22, a storage unit 23, an operation unit 24, a first sheet feeding tray 25A, a second sheet feeding tray 25B, a transport unit 26, a printing unit 27, a sheet discharge unit 28, a sheet discharge tray 29, and a controller 30.

The I/F unit 21 operates as an interface of the network 5. The I/F unit 21 operates as a receiving unit of the invention.

The reception buffer 22 receives the print request received by the I/F unit 21 and temporarily stores the received print request. The storage unit 23 includes a nonvolatile memory such as an EEPROM and stores various data. The storage unit 23 stores request source information included in the print request by which printing by the printing unit 27 has been completed.

The operation unit 24 includes an operation switch and a touch panel. In a case where the controller 30 receives an operation from the operation unit 24, the controller 30 performs a process corresponding to the accepted operation.

A sheet on which print data is printed is stored in the first sheet feeding tray 25A. In addition, the slip sheet is accommodated in the second sheet feeding tray 25B. The slip sheet is different from the sheet accommodated in the first sheet feeding tray 25A in at least one of color and size.

The transport unit 26 includes a roller and a driving unit (not shown) that drives the roller, and feeds the sheet accommodated in the first sheet feeding tray 25A to a transport path 35 indicated by a broken line in FIG. 1, and transports the fed-out sheet to the printing unit 27. Further, the transport unit 26 transports the sheet on which the print data is printed by the printing unit 27 to the sheet discharge unit 28. Further, the transport unit 26 feeds the slip sheet accommodated in the second sheet feeding tray 25B to the transport path 35, and transports the fed-out slip sheet to the printing unit 27 or the sheet discharge unit 28.

The printing unit 27 includes, for example, a print head and a head driver (not shown) that drives and controls the print head, to print an image on a sheet transported to a printing position. Further, the printing unit 27 has a function of printing on both sides of the sheet.

Specifically, a sheet on which an image is printed on one side is transported again to the printing unit 27, and an image is printed on the other side by the printing unit 27.

The sheet discharge unit 28 discharges the sheet printed by the printing unit 27 from a sheet discharge port 33 to the sheet discharge tray 29. Further, in accordance with an instruction from the controller 30, the sheet discharge unit 28 performs shift-sorting the sheet to be discharged into the sheet discharge tray 29. Shift-sorting is a sorting method in which the output position of the sheet on the sheet discharge tray 29 is shifted and overlapped. In a case where the print request to be processed consecutively is a print request from the identical user, the controller 30 instructs the sheet discharge unit 28 to perform shift-sorting. As a result, the sheets printed according to the request from the identical user are discharged to different positions on the sheet discharge tray 29.

The controller 30 performs an operation corresponding to a control unit of the invention. The controller 30 includes a CPU, a ROM, a RAM, other peripheral circuits, and the like as hardware. The controller 30 performs the firmware stored in the storage unit 23, controls each unit of the printer 20, and performs data processing. In the present embodiment, the case where the controller 30 includes one processor (CPU) and the processor implements the function of the controller 30 by executing the processing according to the control program will be described. In addition, the function of the controller 30 may be implemented by a plurality of processors or a plurality of semiconductor chips. For example, the controller 30 may be configured to further include a co-processor such as an application specific integrated circuit (ASIC) or a system-on-a-chip (SoC).

The controller 30 fetches the request source information from the print request stored in the reception buffer 22. In addition, the controller 30 acquires the request source information of the print request processed immediately before the print request stored in the reception buffer 22. The print request stored in the reception buffer 22 is referred to as the current print request. The current print request corresponds to a first print request of the invention. In addition, the print request processed immediately before the current print request is referred to as a previous print request. The previous print request corresponds to a second print request of the invention. The controller 30 compares the previous request source information with the current request source information to determine whether two pieces of request source information are different. In a case where the two pieces of request source information are different, the controller 30 causes the sheet discharge unit 28 to discharge the sheet to the sheet discharge tray 29 so that switching of the request source is distinguishable.

First, the controller 30 determines whether the user information is included in the previous request source information and the current request source information. In a case where the user information is included in the previous request source information and the current request source information, the controller 30 determines whether the previous user information is identical to the current user information. Further, in a case where the user information and the host name have a one-to-one relationship, the controller 30 may acquire the host names from the previous request source information and the current request source information to determine whether the acquired host names are identical. In a case where the user information and the host name have a relationship in which the host computer 10 is used by one user, it can be determined that the user information and the host name have a one-to-one relationship. In a case where the user information and the file name have the one-to-one relationship, the controller 30 acquires the file names from the previous request source information and the current request source information to determine whether the acquired file names are identical. In a case where the file name of the file to be transmitted to the printer 20 by the user is decided, it can be determined that the user information and the file name have the one-to-one relationship.

In a case where the current user information is different from the previous user information, the controller 30 determines that the request source has been switched to instruct the transport unit 26 to transport the slip sheet accommodated in the second sheet feeding tray 25B before causing the printing unit 27 to process the current print request. The transport unit 26 feeds the slip sheet from the second sheet feeding tray 25B and transports the slip sheet along the transport path 35. Further, since there is no instruction from the controller 30, the printing unit 27 does not perform printing on the slip sheet transported through the transport path 35. Therefore, the slip sheet is discharged to the sheet discharge tray 29 without being printed.

In a case where the slip sheet is discharged to the sheet discharge tray 29, the controller 30 acquires print data from the current print request and outputs the acquired print data to the printing unit 27. Further, the controller 30 instructs the transport unit 26 to transport the sheet stored in the first sheet feeding tray 25A. The transport unit 26 feeds the sheet from the first sheet feeding tray 25A and transports the sheet along the transport path 35. In accordance with an instruction from the controller 30, the printing unit 27 prints an image on the sheet transported to the printing position. The sheet printed by the printing unit 27 is transported by the transport unit 26 and discharged to the sheet discharge tray 29. Through the above operations, sheets are stacked in the sheet discharge tray 29 in the order of the sheet printed according to the previous print request, the slip sheet, and the sheet printed according to the current print request from the bottom.

Further, in a case where the current user information is different from the previous user information, the controller 30 may further acquire the group name from the previous request source information and the current request source information to compare them. The controller 30 does not instruct insertion of the slip sheet into the transport unit 26 in a case where a user as a request source of the previous print request is different from a user as a request source of the current print request, but the two users belong to the identical group. Since the two users have different user information, but belong to the identical group, it is determined that the printed sheets are subjected to related printing, whereby the controller 30 does not instruct insertion of the slip sheet. In this case, consumption of the slip sheet can be reduced. In a case where a user as the request source of the previous print request is different from a user as the request source of the current print request, and the two users belong to different groups, the controller 30 instructs the transport unit 26 to insert the slip sheet.

Further, when instructing insertion of slip sheets, the controller 30 may cause the printing unit 27 to print the user information on the slip sheet. In a case where the previous user information is different from the current user information, the controller 30 instructs the transport unit 26 to transport the slip sheet accommodated in the second sheet feeding tray 25B, and instructs the printing unit 27 to print the user information of the previous print request, and the user information of the current print request. The printing unit 27 prints the previous user information on the slip sheet transported to the printing position by the transport unit 26. The surface (first surface) of the slip sheet on which the user information is printed is the lower-side surface when the sheet is discharged to the sheet discharge tray 29, that is, the surface facing the sheet discharge tray 29. This surface is referred to as the undersurface.

Upon printing the previous user information, the printing unit 27 reverses the slip sheet to print the current user information on the reversed slip sheet. The surface (second surface) of the slip sheet on which the current user information is printed is the upper-side surface in a case where the sheet is discharged to the sheet discharge tray 29. This surface is referred to as the upper surface. Since the user information is printed on both sides of the slip sheet, the user can easily identify the printed matter of the user. Further, since the previous user information is printed on the undersurface of the slip sheet and the current user information is printed on the upper surface, the sheet stacked under the slip sheet is the printed matter of the previous user, whereby it is possible to recognize that the sheet stacked on the slip sheet is the printed matter of the current user.

In addition, in a case where the user information is not included in the current request source information, the controller 30 sets the user information to "Unknown". In this case, the controller 30 determines whether the user information is included in the previous request source information. In a case where the user information is not included in the previous request source information or the current request source information and is set to "Unknown", the controller 30 instructs insertion of the slip sheet. In a case where the user information is set to "Unknown", since the user of the previous print request and the user of the current print request are not necessarily identical, the controller 30 instructs the transport unit 26 to insert the slip sheet.

Further, in a case of continuously processing print requests from the identical user, the controller 30 may control each part of the printer 20 so as to recognize the break of the print requests. For example, in a case where the previous user information is identical to the current user information, the controller 30 causes the sheet discharge unit 28 to perform shift-sorting of the sheets to be discharged to the sheet discharge tray 29. In a case where a print request comes from the identical user, since the sheets are discharged to the sheet discharge tray 29 with the sheets shifted, it is possible to easily sort the discharged sheets without inserting the slip sheet.

In accordance with the setting information received from the host computer 10, the controller 30 switches whether to insert the slip sheet. Upon receiving the setting information from the host computer 10, the controller 30 sets, as the tray for feeding the slip sheet, the sheet feeding tray set in accordance with the setting information (the first sheet feeding tray 25A or the second sheet feeding tray 25B in this embodiment). In accordance with the received setting information, the controller 30 switches whether to insert the slip sheet.

Figure 2:
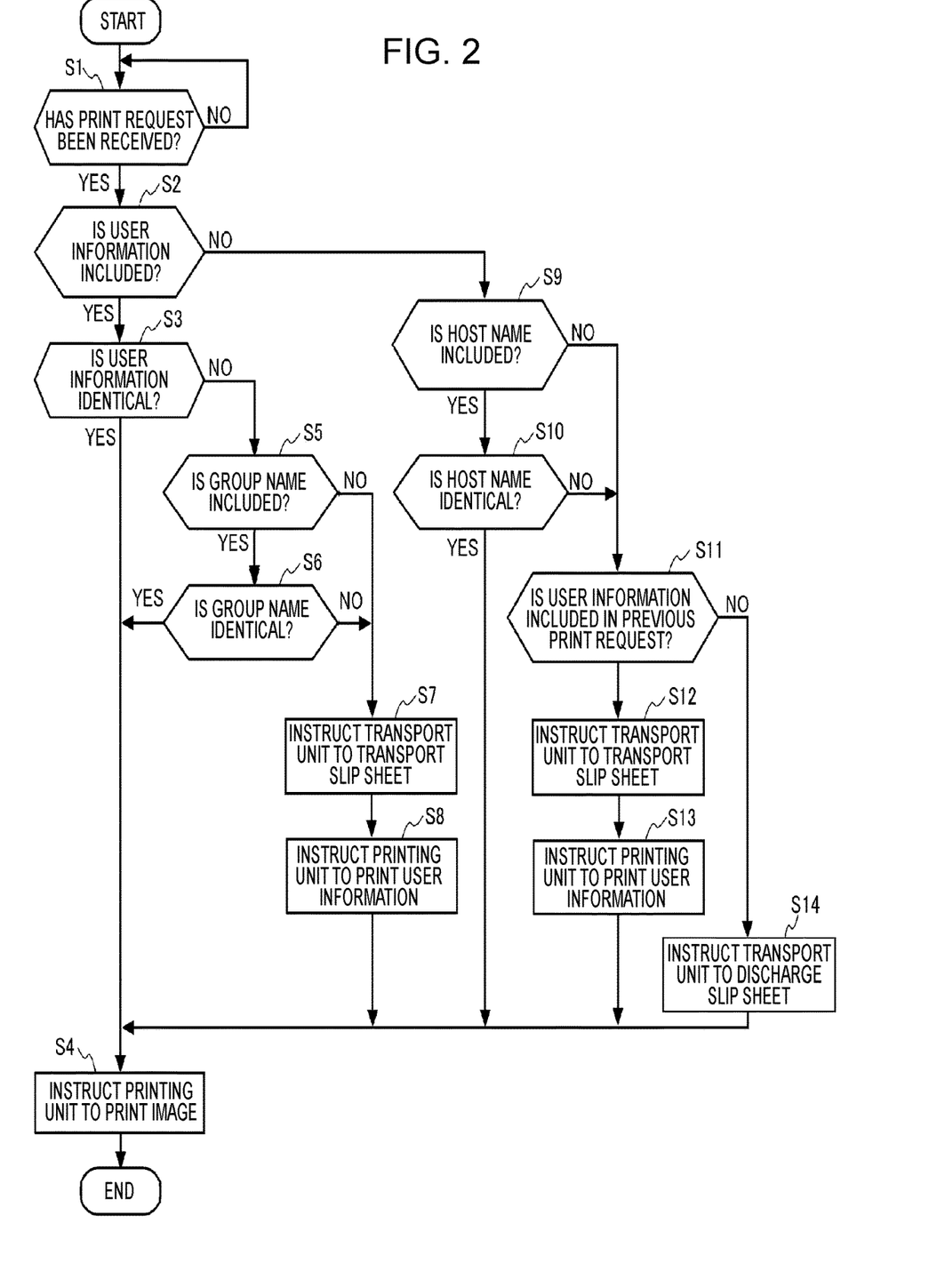
FIG. 2 is a flowchart showing an operation of a printer.

FIG. 2 is a flowchart showing the operation of the printer 20. First, the controller 30 determines whether the I/F unit 21 has received a print request (step S1). In a case where the controller 30 has not received the print request (step S1/"NO"), the controller 30 waits until it receives the print request.

In a case where the controller 30 has received the print request (step S1/"YES"), the controller 30 determines whether the user information is included as the request source information in the received print request (step S2). The received print request is referred to as the current print request. In a case where the user information is included in the current print request (step S2/"YES"), the controller 30 determines whether the user information of the current print request is identical to the user information of the previous print request (step S3).

In a case where the user information of the current print request is identical to the user information of the previous print request (step S3/"YES"), the controller 30 outputs the print data of the current print request to the printing unit 27, and instructs the printing unit 27 to print an image (step S4). The process in which the controller 30 instructs the printing unit 27 to perform printing, and the printing unit 27 prints an image corresponds to the printing step of the invention.

In addition, in a case where the user information of the current print request is not identical to the user information of the previous print request (step S3/"NO"), the controller 30 advances the process to the determination of step S5. In addition, in a case where it is determined that the user information of the current print request is not identical to the user information of the previous print request (step S3/"NO") because the user information is not included in the previous print request, the controller 30 advances the process to the determination of step S5.

In step S5, the controller 30 determines whether the group name is included in the current print request. In a case where the group name is included in the current print request (step S5/"YES"), the controller 30 determines whether the group name of the current print request is identical to the group name of the previous print request (Step S6).

In a case where the group name of the current print request is identical to the group name of the previous print request (step S6/"YES"), the controller 30 outputs the print data of the current print request to the printing unit 27 and instructs the printing unit 27 to print an image (step S4).

In a case where the group name of the current print request is not identical to the group name of the previous print request (step S6/"NO"), the controller 30 advances the process to step S7. In addition, in a case where it is determined that the group names do not match (step S5/"NO") because the controller 30 cannot acquire the group name from the previous print request, the controller 30 advances the process to step S7. The determination in step S3, the determination in step S3, the determination in step S5, and the determination in step S6 correspond to the determination step of the invention.

In step S7, the controller 30 instructs the transport unit 26 to transport the slip sheet to the printing position (step S7). The transport unit 26 feeds the slip sheet from the second sheet feeding tray 25B and transports the slip sheet to the printing position where the printing unit 27 performs printing. Further, the controller 30 instructs the printing unit 27 to print the user information (step S8). In a case where the user information is included in the current print request, the controller 30 outputs the user information to the printing unit 27 to instruct the printing unit 27 to perform printing. In a case where the user information is included in the previous print request, the controller 30 outputs the user information to the printing unit 27 to instruct the printing unit 27 to perform printing. The operation of step S7, or the operations of steps S7 and S8 correspond to the sheet discharge step of the invention.

The printing unit 27 performs printing on the slip sheet under the control of the controller 30. In a case where the user information of the previous print request and the user information of the current print request are input from the controller 30, first, the printing unit 27 prints the user information acquired from the previous print request on the undersurface of the slip sheet wherein the undersurface faces the sheet discharge tray 29 when the slip sheet is discharged to the sheet discharge tray 29. Further, the printing unit 27 reverses the sheet on which the user information of the previous print request is printed, and prints the user information acquired from the current print request on the upper surface of the slip sheet wherein the upper surface is opposite to the sheet discharge tray 29 when the slip sheet is discharged to the sheet discharge tray 29.

Further, in a case where the user information of the previous print request alone is input from the controller 30, the printing unit 27 prints the user information acquired from the previous print request on the undersurface, and reverses the printed sheet to discharge the reversed printed sheet to the sheet discharge tray 29. Further, in a case where the user information of the current print request alone is input from the controller 30, the printing unit 27 prints the user information acquired from the current print request on the upper surface to discharge the printed sheet to the sheet discharge tray 29.

Thereafter, the controller 30 outputs the print data of the current print request to the printing unit 27 and instructs the printing unit 27 to print the image (step S4). As a result, the sheets are stacked on the sheet discharge tray 29 from the bottom in the order of the sheet printed by performing the previous print request, the slip sheet, and the sheet printed by performing the current print request.

In a case where it is determined in step S2 that the user information is not included (step S2/"NO"), the controller 30 determines whether the host name is included in the current print request (step S9). In a case where the host name is included in the current print request (step S9/"YES"), the controller 30 determines whether the host name of the current print request is identical to the host name of the previous print request (step S10).

In a case where the host name of the current print request is identical to the host name of the previous print request (step S10/"YES"), the controller 30 outputs the print data of the current print request to the printing unit 27 to instructs the printing unit 27 to print an image (step S4).

In a case where the host name of the current print request is not identical to the host name of the previous print request (step S10/"NO"), the controller 30 advances to the process to step S11. In addition, in a case where it is determined that the host names do not match (step S10/"NO") because the controller 30 cannot acquire the host name from the previous print request, the controller 30 advances the process to step S11. In addition, in a case where the controller 30 determines in step S9 that the host name is not included in the current print request (step S9/"NO"), the controller 30 advances the process to the determination of step S11.

In step S11, the controller 30 determines whether user information is included in the previous print request. In a case where the user information is included in the previous print request (step S11/"YES"), the controller 30 instructs the transport unit 26 to transport the slip sheet to the printing position (step S12). In addition, the controller 30 outputs the user information of the previous print request to the printing unit 27 and instructs to the printing unit 27 to perform printing (step S13). The user information of the previous print request is input to the printing unit 27 from the controller 30. The printing unit 27 prints the user information acquired from the previous print request on the undersurface, and reverses the printed sheet to discharge the reversed printed sheet to the sheet discharge tray 29. That is, the printing unit 27 discharges the slip sheet to the sheet discharge tray 29 so that the undersurface of the sheet faces the sheet discharge tray 29. Thereafter, the controller 30 outputs the print data of the current print request to the printing unit 27 and instructs the printing unit 27 to print the image (step S4). As a result, the sheets are stacked on the sheet discharge tray 29 from the bottom in the order of the sheet printed by performing the previous print request, the slip sheet, and the sheet printed by performing the current print request. The operations of step S12, or step S12 and step S13 correspond to the transport step of the invention.

In a case where the user information is not included in the previous print request (step S11/"NO"), the controller 30 instructs the transport unit 26 to transport the slip sheet to the printing position (step S14). The determination in step S11 corresponds to the determination step of the invention. Further, the operation of step S14 corresponds to the discharge step of the invention. The slip sheet transported by the transport unit 26 is discharged to the sheet discharge tray 29 without the printing of the user information by the printing unit 27. Thereafter, the controller 30 outputs the print data of the current print request to the printing unit 27 and instructs the printing unit 27 to print the image (step S4). As a result, the sheets are stacked on the sheet discharge tray 29 from the bottom in the order of the sheet printed by performing the previous print request, the slip sheet, and the sheet printed by performing the current print request.

As described above, the printer 20 of the present embodiment includes the I/F unit 21 that operates as a receiving unit, the printing unit 27, the sheet discharge tray 29, and the controller 30 that operates as the controller 30. The printing unit 27 performs the current print request received by the I/F unit 21 to print an image on the sheet. A sheet on which an image is printed by the printing unit 27 is discharged to the sheet discharge tray 29. In a case where the request source of the current print request is different from the request source of the previous print request which is the print request immediately before the current print request, the controller 30 discharges the sheet for which the current print request is processed to the sheet discharge tray so that switching of the request source is distinguishable. Therefore, reduction in throughput of printing can be suppressed and sorting of the discharged sheet can be easily performed, compared with the case of inserting the slip sheet every time the print request is switched.

In a case where the user information indicating the request source of the current print request is different from the user information indicating the request source of the previous print request, the controller 30 causes the printing unit 27 to output the slip sheet to the sheet discharge tray 29 before the controller 30 causes the printing unit 27 to process the current print request. Therefore, the slip sheet is inserted in a case where the user information is switched, so that the slip sheet is not inserted in a case where processing a print request from the identical request source. Therefore, consumption of the slip sheet can be suppressed.

In a case where the user information indicating the request source of the current print request is different from the user information indicating the request source of the previous print request, the controller 30 acquires, from the current print request, the group name for identifying the group to which the user belongs. In a case where the acquired group name is identical to the group name acquired from the previous print request, the controller 30 does not cause the printing unit 27 to output the slip sheet to the sheet discharge tray 29. Therefore, it is possible to easily sort the discharged sheets while suppressing consumption of the slip sheets.

In a case where the user information cannot be acquired from the current print request, the controller 30 acquires, from the current print request, the host name indicating the host computer 10, which is a transmission source of the current print request, or the file name for printing the image as information indicating the request source. The controller 30 compares the host name or file name acquired from the current print request with the host name or file name acquired from the previous print request. In a case where the two host names or the two file names are different, the controller 30 causes the printing unit 27 to output the slip sheet to the sheet discharge tray before causing the printing unit 27 to process the current print request. Therefore, even in a case where the user information cannot be acquired, it is determined whether the request source is identical, whereby it is possible to insert the slip sheet in a case where the request sources are not identical.

Further, the controller 30 causes the printing unit 27 to print, on the first surface of the slip sheet, information indicating the request source of the previous print request, to print, on the second surface of the slip sheet, information indicating the request source of the current print request. Therefore, sorting of discharged sheets can be performed more easily.

In a case where the information indicating the request source cannot be acquired from the current print request and the previous print request, the controller 30 causes the printing unit 27 to output the slip sheet to the sheet discharge tray 29 before causing the printing unit 27 to process the current print request. Therefore, in a case where information indicating the request source cannot be acquired from the current print request and the previous print request, it is determined that the request is a print request from a different request source, and the slip sheet can be inserted.

Further, the printer 20 includes the sheet discharge unit 28 that discharges the sheet on which the image is printed by the printing unit 27 to the sheet discharge tray 29. In a case where the request source of the current print request is identical to the request source of the previous print request, the controller 30 causes the sheet discharge unit 28 to perform sheet discharge such that a discharge position at the sheet discharge tray of a sheet for which the current print request is processed is different from a discharge position at the sheet discharge tray of a sheet for which the previous print request is processed. Therefore, it is possible to easily sort the discharged sheets while suppressing consumption of the slip sheets.

In accordance with the setting information received by the I/F unit 21, the controller 30 switches whether to discharge the sheet to the sheet discharge tray 29 so that switching of the request source is distinguishable. Therefore, whether to discharge the sheet to the sheet discharge tray 29 so that switching of the request source is distinguishable can be switched by transmitting the setting information from outside the printer 20.

The above-described embodiment is a preferred embodiment of the invention. However, the invention is not limited thereto, and various modifications can be made without departing from the gist of the invention. For example, each functional unit of the printer 20 shown in FIG. 1 indicates a functional configuration, and a specific implementation form is not particularly limited. That is, it is not always necessary to implement hardware corresponding to respective functional units, but it is of course possible to construct a configuration in which the functions of a plurality of functional units are implemented by executing a program by one processor. In addition, in the above embodiment, part of the functions implemented by software may be implemented by hardware, or part of the functions implemented by hardware may be implemented by software.

In addition, the processing unit of the flowchart shown in FIG. 2 is divided in accordance with the main processing contents in order to make the processing of the controller 30 easier to understand. The invention is not limited by the method and the name of division of the processing unit shown in the flowchart of FIG. 2. In addition, the processing by the controller 30 can be divided into more processing units depending on the processing contents, or can be divided such that one processing unit includes more processing. In addition, the processing order of the above flowchart is not limited to the illustrated example.

In a case where the method of controlling the printing apparatus of the invention is implemented by using a computer, the invention can also be configured in the form of a program executed by a computer to implement the above control method, a recording medium in which the program is recorded so as to be readable by the computer, or a transmission medium for transmitting the program. As the recording medium, a magnetic or optical recording medium or a semiconductor memory device can be used. Specifically, examples of the recording medium include a portable type or fixed type recording medium such as a flexible disk, an hard disk drive (HDD), a compact disk read only memory (CD-ROM), a digital versatile disk (DVD), a Blu-ray (registered trademark) disc, a magneto-optical disk, a flash memory, or a card type recording medium. Further, the recording medium may be a nonvolatile storage device such as a random access memory (RAM), a read only memory (ROM), a HDD, or the like which is an internal storage device included in the image display device.

This application claims priority to Japanese Application No. 2018-016618, filed 1 Feb. 2018, the entirety of which is incorporated by reference herein

What is claimed is:

1. A printing apparatus comprising:
   a receiving unit that receives a plurality of print requests, comprising at least a first print request and a second print request, the second print request being a print request immediately before the first print request;
   a printing unit that processes each print request received by the receiving unit to print an image on a sheet;
   a sheet discharge tray to which the sheet on which the image is printed by the printing unit is discharged; and
   a control unit that:
      identifies a request source of the first print request and a request source of the second print request,
      when the request source of the first print request or the request source of the second print request is not available, sets the corresponding request source as "unknown";
      determines whether the request source of the first print request and the request source of the second print request are different,
      in response to a determination that the request source of the first print request and the request source of the second print request are different, causes the printing unit to discharge, to the sheet discharge tray, an insertion sheet between printing of the second print request and printing of the first print request, the insertion sheet being different from a sheet on which an image is printed by processing the first print request or the second print request, and
      in response to a determination that the request source of the first print request or the request source of the second print request is "unknown", causes the printing unit to output an insertion sheet to the sheet discharge tray between printing of the second print request and printing of the first print request.

2. The printing apparatus according to claim 1, wherein in a case where user information indicating a request source of the first print request is different from user information indicating a request source of the second print request, the control unit causes the printing unit to discharge, to the sheet discharge tray, an insertion sheet different from a sheet on which an image is printed by processing a print request before causing the printing unit to process the first print request.

3. The printing apparatus according to claim 2, wherein the control unit acquires, as information indicating a request source of the first print request, a group name identifying a group to which a user indicated by user information belongs from the first print request, and does not cause the printing unit to output the insertion sheet to the sheet discharge tray in a case where the acquired group name is identical to a group name acquired from the second print request.

4. The printing apparatus according to claim 2, wherein in a case where the control unit is not able to acquire user information as information indicating a request source of the first print request, the control unit acquires, from the first print request, as information indicating the request source, a host name indicating a host device that is a transmission source of the first print request, or a file name of an image to be printed, compares the acquired host name or the acquired file name with a host name or a file name acquired from the second print request, and in a case where the respective host names or the respective file names are different, causes the printing unit to output the insertion sheet to the sheet discharge tray before causing the printing unit to process the first print request.

5. The printing apparatus according to claim 2, wherein the control unit causes the printing unit to print information indicating a request source of the second print request on a first surface of the insertion sheet, and causes the printing unit to print information indicating a request source of the first print request on a second surface of the insertion sheet.

6. The printing apparatus according to claim 1, further comprising a sheet discharge unit that discharges a sheet on which an image is printed by the printing unit to the sheet discharge tray,
   wherein in a case where a request source of the first print request is identical to a request source of the second print request, the control unit causes the sheet discharge unit to perform sheet discharge such that a discharge position at the sheet discharge tray of a sheet for which the first print request is processed is different from a discharge position at the sheet discharge tray of a sheet for which the second print request.

7. The printing apparatus according to claim 1, wherein the control unit switches whether to discharge a sheet to the sheet discharge tray so that switching of a request source is distinguishable in accordance with setting information received by the receiving unit.

8. A method of controlling a printing apparatus, the method comprising:
   receiving a first print request and a second print request, the second print request being a print request immediately before the first print request;
   identifying a request source of the received first print request and a request source of the received second print request;
   when the request source of the first print request or the request source of the second print request is not available, setting the corresponding request source as "unknown";
   determining whether the request source of the first print request is different from the request source of the second print request which is a print request immediately before the first print request;
   in response to a determination that the request source of the first print request and the request source of the second print request are different, discharging, to a sheet discharge tray, an insertion sheet after printing of the second print request and before printing of the first print request, the insertion sheet being different from a sheet on which an image is printed by processing the first print request or the second print request; and in response to a determination that the request source of the first print request or the request source of the second print request is "unknown", discharging, to a sheet discharge tray, an insertion sheet between printing of the second print request and printing of the first print request.

* * * * *